March 10, 1931.   G. KEINATH ET AL   1,795,607
TESTING APPARATUS FOR MEASURING TRANSFORMERS
Filed March 29, 1929   3 Sheets-Sheet 1
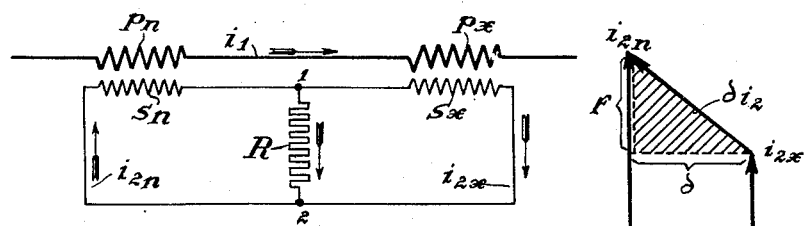
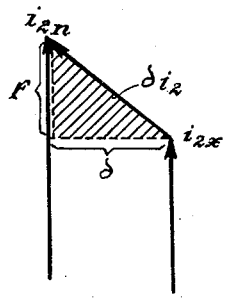
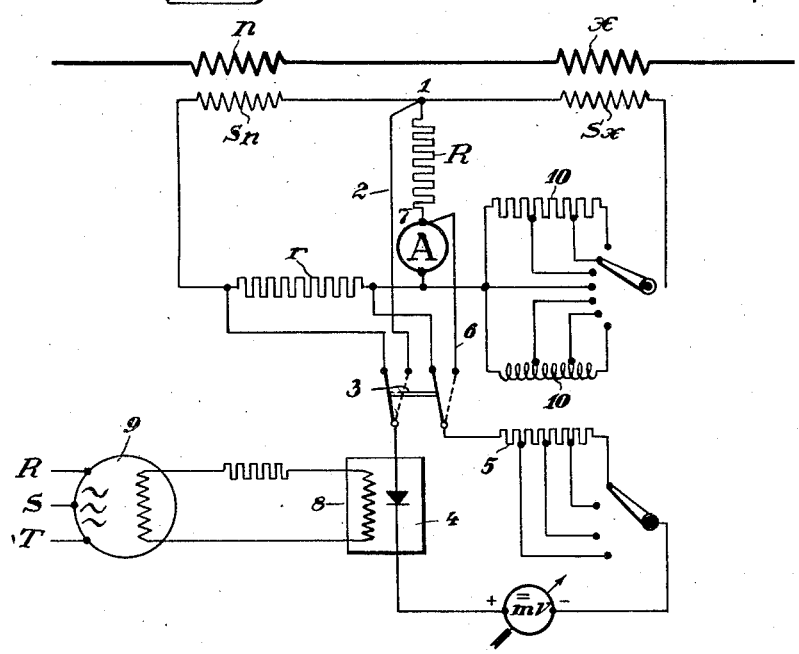
INVENTORS
GEORG KEINATH
OTTO SIEBER
BY
ATTORNEYS Patented Mar. 10, 1931

1,795,607

UNITED STATES PATENT OFFICE

GEORG KEINATH, OF BERLIN-CHARLOTTENBURG, AND OTTO SIEBER, OF BERLIN-SPANDAU, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

TESTING APPARATUS FOR MEASURING TRANSFORMERS

Application filed March 29, 1929, Serial No. 350,877, and in Germany January 5, 1928.

Our present invention relates to the testing of measuring transformers, and has for its object to provide means which will operate accurately and reliably even when weak currents are employed.

Figure 4:
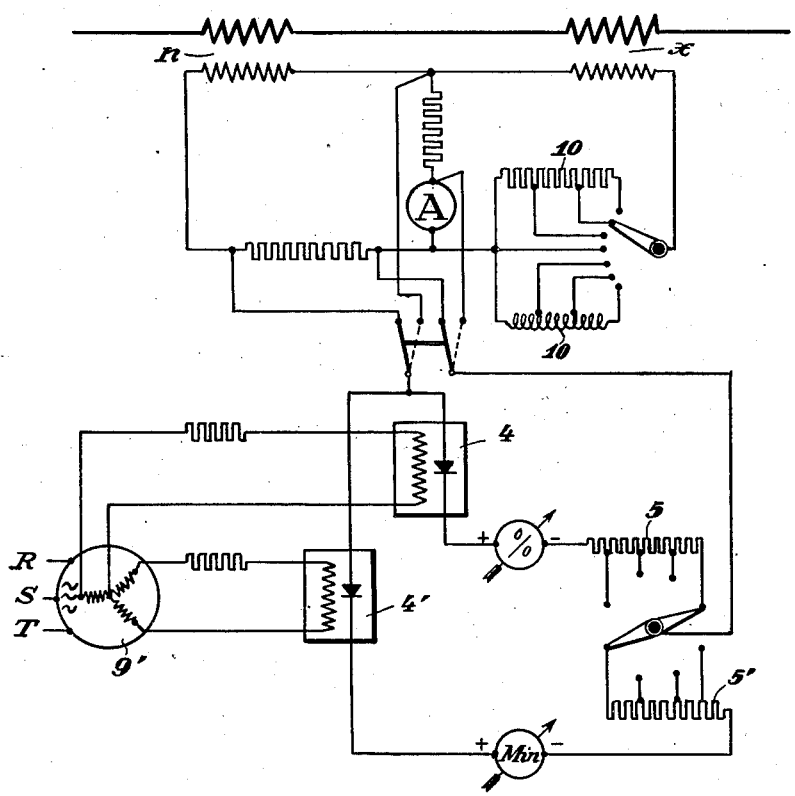
Figure 5:
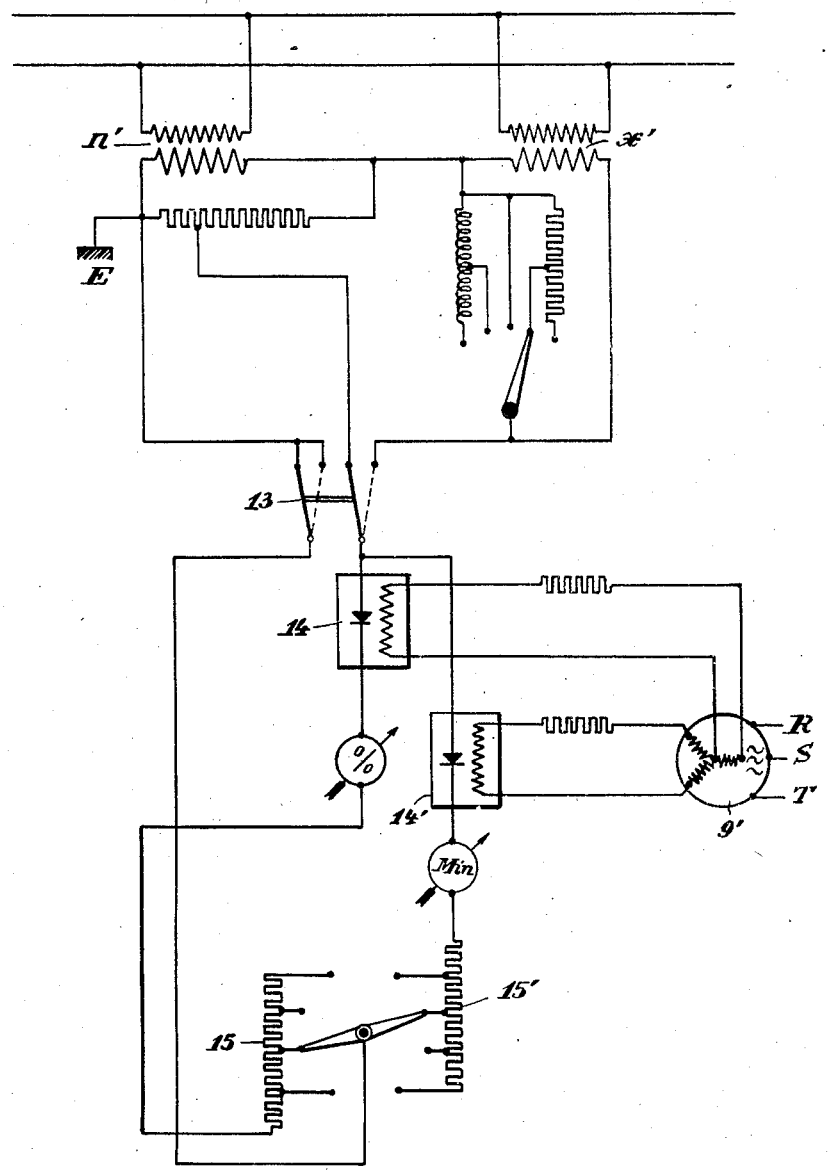

For a thorough explanation of this invention, reference is to be had to the accompanying drawings, in which Fig. 1 is a diagram of a measuring circuit such as used prior to our invention, and Fig. 2 is a diagram illustrating certain properties of the currents existing in the arrangement of Fig. 1; Figs. 3, 4, and 5 are circuit diagrams showing three satisfactory arrangements embodying the novel features of our present invention.

The measurement of weak alternating currents by means of their rectification, which is most simply done by half periodic interruptions and their measurement then by direct current instruments, is known. This method is also applicable for the testing of current transformers in the circuit according to Figure 1. In this $x$ indicates the transformer to be tested, $n$ a normal transformer of the same kind serving as a standard of comparison. The primary windings $p_n$, $p_x$ have the same current $i_1$ flowing through them. The secondary windings $s_n$, $s_x$ are connected to a resistance R, through which the difference of the secondary currents $\Delta i_2$ flows. This difference according to Figure 2 may be resolved into a component $f$, which is in phase with the secondary current of the normal transformer $i_{2n}$, and a component $\delta$ which is displaced by 90° relatively to the phase of the current $i_{2n}$. The component $f$ gives the difference of the transforming ratios of the two transformers, the component $\delta$ the difference of the phase error. The two currents $f$ and $\delta$ may be determined by means of a watt meter instrument, of which one coil carries the current $\Delta i_2$ while the other carries a current either in phase with $i_{2n}$ or a current which is displaced by 90° relatively to $i_{2n}$. If in this measurement it is desired to transform the alternating current by means of half periodic interruptions into direct current, the two components $f$ and $\delta$ may be obtained by the current $i_2$ being sent into the rectifier and the phase of the interruption so arranged that first a half wave in the phase of $i_{2n}$ is switched in and next a half wave in a phase displaced by 90°. In this, however, there are difficulties both of a general character as well as special difficulties appertaining to the method of connection mentioned above.

The commutators used in general for the rectifier have the disadvantage, that owing to the friction of the brushes, thermal forces are produced which affect very sensitive direct current instruments such as are here mostly used, and furthermore, the phase cannot be very accurately adjusted on these instruments. The first defect is overcome according to the present invention by using as a rectifier a frictionless instrument, viz:—a diaphragm rectifier. This instrument is similar to a telephone. The vibrating diaphragm makes contact for half a cycle or wave with a pencil opposite its centre, when the coils are supplied with alternating current, and an alternating current which is led through this contact is then interrupted at each half cycle and then according to the phase position, more or less completely rectified. The second fault of an inexact phase adjustment is overcome by the use of a phase displacer.

There is however something more important than the said faults connected with the use of the rectified alternating currents, due directly to the method of connection shown in Figure 1 of the accompanying drawings. The measurement is the more exact the smaller is the resistance R. If now it were desired to put a sensitive direct current instrument in the branch with a rectifier connected therein, the requirement of a small resistance could not be complied with; as naturally the current-sensitive instrument has a high resistance. This arrangement will also give rise to the following conditions: With the making and breaking of the alternating current in any desired phases displaced from each other by a half period, or half cycle, switching processes take place which lead to a confusion of the current curve to be again given out. These switching operations can also be neglected if the phase displacement in the direct current instrument to be connected up is very small. This would again necessitate a greater resistance of the measuring instruments, which is in opposition to the requirements of the connection of the resistance R in the branch. A still worse result of the arrangement of the interrupter in the branch of R is, however, that on interrupting this branch the equalization of the currents in the branch formed by the secondary windings $s_n s_x$ alone would have to take place at once. By this half periodic switching over, switching operations are produced in the highly inductive current circuit of the secondary windings, which make the whole of the measurement illusory.

According to the present invention the difficulties arising in the connection according to Figure 1 are overcome by the measuring instrument with the rectifier not being connected in series with the resistance R, but parallel thereto. The branch with the resistance R is therefore never interrupted and the flow of the current in the secondary windings is normal. The measuring instrument itself can have a high resistance, as is necessary in order that its indications may not be influenced by the switching operation and as is of course proper for an instrument of high sensitiveness. The current in the measuring instrument is thus so small compared with the current in the resistance R, that the influence of its interruptions on the whole circuit may be neglected.

Figures 3, 4 and 5 show circuits according to the invention. In these three figures, $n$ (or $n'$) designates the normal transformer used as a standard of comparison, and $x$ (or $x'$) the transformer to be tested. In Fig. 3, $S_n$ and $S_x$ are the secondaries of the respective transformers. R is a resistance, A an ammeter, $r$ a resistance in series with the secondary of the normal transformer $n$. From the terminal 1 of the resistance R a line 2 runs to the double pole change-over switch 3. In the dotted position of this switch the line 2 runs to a diaphragm rectifier 4, from this to the measuring instrument $mV$, then through a variable series resistance 5, the second pole of the switch 3 and line 6 to the other terminal 7 of the resistance R. The diaphragm rectifier 4 is energized by the coil 8 which is connected to a phase displacer 9. In order to bring the interruptor, which is adjusted for a half period interruption, to such a phase that the half period given by it is in phase with the current $i_{2n}$, the switch 3 is set in the position shown in full lines, when the branch with the rectifier 4 and the indicating instrument $mV$ is placed in parallel to a resistance $r$ in the secondary circuit of the normal transformer $n$. On the adjustment of the phase displacer to the maximum swing of the indicating instrument $mV$ like phase is obtained between the energizing current of the coil 8 and the secondary current $i_{2n}$. On account, however, of the greater sensitiveness it is preferable to so adjust the phase displacer, that the indicating instrument points to zero, when the two currents mentioned differ by 90° and in order to make the phases agree, the phase displacer is rotated by 90°. If the energizing current of the coil 8 has been adjusted to a like phase with the secondary current $i_{2n}$, then the indicating instrument gives a throw proportional to the current difference $f$ (Figure 2). If the energizing current in the coil 8 is adjusted to a phase difference of 90° with respect to the secondary current $i_{2n}$, then the throw of the indicating instrument is proportional to the phase error $\delta$, Figure 2.

By altering the series resistance 5 of the indicating instrument to correspond to different loads, the same throw of the indicating instrument can be obtained for the same percentage amount of the current difference $f$ or the same angular amount of the phase error $\delta$ with all loads. The regulating resistances for the secondary coils $s_x$ of the test transformer are shown at 10. A current indicator A is provided for this. This is only to indicate whether the secondary windings are connected aiding each other or opposed to each other. If connected wrongly the instrument will be deflected and thus give a warning before connecting up the measuring instrument which would be damaged in the case of a faulty connection.

If it is desired to obtain a simultaneous reading of the differences of the transmission ratios and of the phase, then two indicating instruments are employed in to the circuit as shown in Figure 4. The instrument which shows the transmission difference can then be calibrated directly in percentage, if suitable series resistances 5 are provided for the various loads; the other instrument showing the phase difference, with the series resistances 5', indicates in a corresponding manner in minutes. In order, with the same phase displacer, to produce two energizing currents displaced by 90° in the rectifiers 4 and 4' of the two indicating instruments, a phase displacer 9' is preferably used, the winding of which is connected in three phase star as shown in Figure 4. One phase is then taken from a neutral point potential and the other from a linked potential. This connection arrangement is suitable for use by inexperienced attendants. It is also suitable for the testing of transformers in the working position, also for use when travelling, as the most sensitive part of the galvanometer may always be constructed as an indicating instrument with axial bearing.

In the same way as for the testing of a current transformer the testing of a potential transformer may be carried out by comparing with a normal transformer with the aid of diaphragm rectifiers and direct current indicating instruments, as shown in Figure 5. The potential transformers n', x' are connected with opposing secondaries and the potential difference is taken off at switch 13 to which is connected the indicating instruments for percentage and minutes with the series rectifiers 14 and 14' and the series resistances 15, 15'. The phase displacer is connected as in Figure 4. The use of the said switching arrangement may be still further simplified by the use of a normal transformer having a negligible amount of error. Any calculation of the errors given by the indicating instrument which in the first place is only measured as relative to the normal transformer, to bring it to an absolute value, is then dispensed with. For example the accuracy of measurement will very often satisfy practical requirements, if the indications are used without correction, with an error of the normal transformer of 0.2% in the transmission ratio and 5 minutes in the phase.

Having now particularly described and ascertained the nature of our said invention and in what manner the same is to be performed, we declare that what we claim is:—

1. In a testing arrangement for measuring transformers, a source of alternating electric current, a normal transformer serving as a standard of comparison, a transformer to be tested, the primaries of both transformers receiving current from said source, a rectifier energized synchronously with said source and a contact made by said rectifier during alternate half cycles, a direct current meter in series with said rectifier contact, and means for connecting the secondaries of said transformers with each other and with the series connection of the rectifier contact and the said meter in such a manner that such meter will permit of measuring the difference of an electrical characteristic of the two transformer secondaries with respect to value and phase.

2. In a testing arrangement for measuring transformers, a source of alternating electric current, a normal transformer serving as a standard of comparison, a transformer to be tested, the primaries of both transformers receiving current from said source, a rectifier energized synchronously with said source and a contact made by said rectifier during alternate half cycles, a direct current meter in series with said rectifier contact, a resistance, means for connecting said resistance with the secondaries of said transformers in such a manner that the difference between the secondary currents will flow through said resistance, means for arbitrarily adjusting the phase of the current energizing the rectifier, a resistance in series with the secondary of the normal transformer, and a change-over switch by which the series connection of rectifier contact and direct current meter can be connected selectively in parallel with one or the other of said resistances.

3. A testing arrangement according to claim 2, in which the secondary circuit of the transformer to be tested contains a variable loading resistance.

4. A testing arrangement according to claim 2, in which a variable resistance is connected in series with the direct current meter.

5. A testing arrangement according to claim 2, in which the secondary circuit of the transformer to be tested contains a variable loading resistance, and in which a variable resistance is connected in series with the direct current meter.

6. In a testing arrangement for measuring transformers, a source of alternating electric current, a normal transformer serving as a standard of comparison, a transformer to be tested, the primaries of both transformers receiving current from said source, two rectifiers energized synchronously with said source, each rectifier having associated therewith, a contact made by the respective rectifier during alternate half cycles, two direct current meters, each in series with the respective rectifier contact, a resistance, means for connecting said resistance with the secondaries of said transformers in such a manner that the difference between the secondary currents will flow through said resistance, means for arbitrarily adjusting the phase of the current energizing the rectifiers, a resistance in series with the secondary of the normal transformer, and a change-over switch by which the series connections of the rectifier contacts with the respective direct current meters can be connected selectively in parallel with one or the other of said resistances.

7. A testing arrangement according to claim 6, in which the secondary circuit of the transformer to be tested contains a variable loading resistance.

8. A testing arrangement according to claim 6, including a variable resistance connected in series with each of the respective direct current meters.

9. A testing arrangement according to claim 6, in which the secondary circuit of the transformer to be tested contains a variable loading resistance, and in which there are variable resistances, each connected in series with the respective direct current meter.

10. In a testing arrangement for measuring transformers, a source of alternating electric current, a normal transformer serving as a standard of comparison, a transformer to be tested, the primaries of both transformers receiving current from said source, a rectifier energized synchronously with said source and a contact made by said rectifier during alternate half cycles, means for arbitrarily adjusting the phase of the current energizing the rectifier, a resistance located in the secondary circuit of the normal transformer, and a change-over switch by which the series connection of rectifier contact and direct current meter can be connected selectively in parallel with said resistance or with the free ends of the oppositely series-connected secondaries of the transformers.

11. A testing arrangement according to claim 10, in which a variable loading resistance is located in the secondary circuit of the transformer to be tested.

12. A testing arrangement according to claim 10, in which a variable resistance is connected in series with the direct current meter.

13. A testing arrangement according to claim 10, in which a variable loading resistance is located in the secondary circuit of the transformer to be tested, and in which a variable resistance is connected in series with the direct current meter.

14. In a testing arrangement for measuring transformers, a source of alternating electric current, a normal transformer serving as a standard of comparison, a transformer to be tested, the primaries of both transformers receiving current from said source, two rectifiers energized synchronously with said source, each rectifier having associated therewith, a contact made by the respective rectifier during alternate half cycles, two direct current meters, each in series with the respective rectifier contact, means for arbitrarily adjusting the phase of the current energizing the rectifiers, a resistance in the secondary circuit of the normal transformer, and a change-over switch by which the series connections of the rectifier contacts with the respective direct current meters can be selectively either connected in parallel with said resistance or connected with the free ends of the oppositely series-connected secondaries of the transformers.

15. A testing arrangement according to claim 14, in which a variable loading resistance is located in the secondary circuit of the transformer to be tested.

16. A testing arrangement according to claim 14, in a variable resistance is connected in series with each of the respective direct current meters.

17. A testing arrangement according to claim 14, in which a variable loading resistance is located in the secondary circuit of the transformer to be tested, and in which there are additional variable resistances, each connected in series with the respective direct current meter.

In testimony whereof we affix our signatures.

GEORG KEINATH.
OTTO SIEBER.